United States Patent [19]
Hisano et al.

[11] Patent Number: 5,807,207
[45] Date of Patent: Sep. 15, 1998

[54] CONTROL APPARATUS FOR AN AUTOMATIC TRANSMISSION

[75] Inventors: Takayuki Hisano; Kazumasa Tsukamoto; Masahiro Hayabuchi; Hiroshi Tsutsui, all of Anjo, Japan

[73] Assignee: Aisin AW Co., Ltd., Anjo, Japan

[21] Appl. No.: 771,144

[22] Filed: Dec. 20, 1996

[30] Foreign Application Priority Data

Jun. 3, 1996 [JP] Japan .................................. 8-160466

[51] Int. Cl.⁶ .................................................. F16H 61/04
[52] U.S. Cl. .......................................... 477/116; 477/117
[58] Field of Search .................... 477/115, 116, 477/117, 121, 143, 144

[56] References Cited

U.S. PATENT DOCUMENTS

| | | | |
|---|---|---|---|
| 4,944,200 | 7/1990 | Bendford et al. | 477/156 |
| 4,982,622 | 1/1991 | Yamamoto et al. | 477/117 |
| 5,088,357 | 2/1992 | Kamada et al. | 477/117 |
| 5,329,830 | 7/1994 | Kitagawa et al. | 477/117 |
| 5,351,577 | 10/1994 | Ando et al. | 477/116 |
| 5,385,511 | 1/1995 | Iizuka | 477/117 X |

*Primary Examiner*—Khoi Q. Ta
*Attorney, Agent, or Firm*—Oliff & Berridge, PLC

[57] ABSTRACT

In order to improve transmission efficiency of an automatic transmission, an engagement brake which does not cause drag is used and the surety of its engagement and release, and quick switching between forward maneuver and backward maneuver, is enabled. The automatic transmission comprises a transmission mechanism to achieve forward maneuver and backward maneuver. A backward motion brake which stops the rotation element to achieve backward maneuver is the engagement brake and an input clutch to transfer power by meshing with the rotation element during both forward maneuver and backward maneuver is a friction clutch. The control apparatus executes the control operation to prepare for speedy re-meshing by holding a supply pressure for the clutch hydraulic servo at a sufficient oil pressure to place the pressure in the stand-by condition at the piston stroke position immediately before the start of clutch engagement during the engagement or releasing of engagement of the engagement brake at the time of D→R or R→D shift.

17 Claims, 11 Drawing Sheets

|     | C-1 | C-2 | B-1 | B-2 | B-3 | B-R |
|-----|-----|-----|-----|-----|-----|-----|
| P   |     |     |     |     |     |     |
| REV | ○   |     |     |     |     | ○   |
| N   |     |     |     |     |     |     |
| 1ST | ○   |     |     |     |     |     |
| 2ND |     | ○   |     |     | ○   |     |
| 3RD | ○   | ○   |     |     | ○   |     |
| 4TH |     | ○   | ○   |     | ○   |     |
| 5TH |     | ○   |     | ○   |     |     |

FIG.2

CONTROL APPARATUS FOR AN AUTOMATIC TRANSMISSION

BACKGROUND OF THE INVENTION

1. Field of Application

The invention relates to a control apparatus for an automatic transmission, in particular, a control apparatus which controls relatively a backward maneuver brake and an input clutch in the transmission mechanism of the automatic transmission.

2. Description of the Related Art

In a prior art automatic transmission, in order to achieve a backward maneuver, or movement, the power is input to the transmission mechanism by the meshing of the input clutch, at the same time the rotation element is stopped by the meshing, or engagement of, the backward motion brake. The backward motion brake, in general, comprises a multi-disc type friction meshing apparatus for effective control. That is, one disc is lock-supported on the side of the rotation element in the transmission mechanism, while the other disc is engaged with the first disc by having an oil pressure servo apply pressure to the plurality of friction discs, composed of friction materials, and a separator disc which are lock-supported on the anchoring element side, such as the transmission case. The backward maneuver is achieved by having the backward motion brake cause the rotation element, which operates as a reaction element during the backward maneuver, stop by meshing with the anchoring element. In such a brake, engagement is enabled by having the hydraulic servo apply pressure even when the rotation element to be stopped is rotating or, equivalently, the friction material and the separator disc in the friction discs are rotating with respect to one another.

However, a multi-disc type friction engagement apparatus, in spite of the advantage of favorable control, cannot avoid the occurrence of drag caused by oil during the release of the brake. This is because space is created between the friction material and the separator disc of the friction disc during the release of the pressure force on the friction disc. The space, although set to be extremely small, considering the brake engagement response, allows the oil which is circulated for lubrication of each part in the transmission mechanism to enter therein.

Because of the conditions described above, when a multi-disc friction engagement apparatus is used as a brake during the achievement of the backward maneuver, the resistance caused by the drag described above increases with the number of friction materials. Because the backward maneuver of the automatic transmission is set at a large gear ratio and the torque amplification in the transmission mechanism is also large during achievement of backward maneuver, this causes the application of a large torque on the friction disc which supports the reaction torque, and having large number of friction materials to absorb the torque increases the resistance caused by drag, which is undesirable in maintaining the power transmission efficiency rate of the automatic transmission.

Hence, one suggested solution to eliminate the drag is a structure in which an engagement brake having teeth engaging with teeth, such as a dog clutch, but use of such an engagement type brake may cause the following problem. In fact, in selecting reverse (R) range, if the meshing of the input clutch precedes the engagement of the engagement-type brake, the brake engages with the condition wherein torque is transmitted to the rotation element, making the engagement difficult. Moreover, if meshing of the input clutch is delayed to avoid the difficulty, the achievement of the backward maneuver is also delayed. In addition, in selecting drive (D) range, if the meshing of the input clutch, which is meshed during D range precedes the release of the engagement of the brake, the condition occurs wherein torque is transmitted to the engagement brake, making the release of the engagement of the brake difficult. This, similar to the case of the selection of the R range, if meshing of the input clutch is delayed, achievement of the backward maneuver is also delayed.

SUMMARY OF THE INVENTION

Hence, a first object of the invention is to provide a control apparatus for an automatic transmission using an engagement-type brake which does not create drag but improves the power transmission efficiency rate, enabling sure engagement by avoiding the application of an input torque on the brake during engagement, and enabling speedy achievement of the backward maneuver.

A second object of the invention is to provide a control apparatus for an automatic transmission using an engagement-type brake which does not create drag but improves the power transmission efficiency rate, enabling the sure release of engagement by avoiding the application of an input torque on the brake during the release of the engagement, and enabling the speedy release of the backward maneuver.

Moreover, a third object of the invention is to enable a sure achievement of the backward maneuver and to reduce the time for achieving the backward maneuver when the input clutch to achieve forward maneuver and backward maneuver are the same.

Moreover, a fourth object of the invention is to enable the sure achievement of the forward maneuver and to reduce the time for achieving the forward maneuver when the input clutch to achieve the forward maneuver and the backward maneuver are the same.

Furthermore, a fifth object of the invention is to enable the sure achievement of the backward maneuver by executing the meshing of the input clutch after the completion of the movement of the engagement member of the backward motion brake.

A sixth object of the invention is to reduce the time until the achievement of the forward maneuver by sure and accurate the determination of the release of the engagement.

Moreover, a seventh object of the invention is to make the structure of the first determination means to detect the start of the engagement simple without requiring special additional detection means.

Furthermore, an eighth object of the invention is to enable a sure and accurate determination of the movement completion position of the engagement member of the backward motion brake based on the oil pressure.

Moreover, a ninth object of the invention is to make the structure of the second determination means to detect the release of engagement simple without requiring a special additional detection means.

In addition, a tenth object of the invention is to enable a sure and accurate determination of the engagement release position of the backward motion brake based on the oil pressure.

In order achieve the first object, the invention provides a control apparatus for an automatic transmission comprising a transmission mechanism to achieve forward maneuver and backward maneuver, a first rotation element which is made to stop by meshing to achieve backward maneuver, a second rotation element to transfer power to the transmission mechanism, a backward motion brake to stop the first rotation element by meshing, and an input clutch to transfer power from the engine to the second rotation element, wherein the backward motion brake is an engagement brake which stops the first rotation element by meshing with the first rotation element when the backward maneuver is selected, the input clutch is a friction clutch having a clutch hydraulic servo and meshes when the backward maneuver is selected, and the control apparatus comprises a first control means which causes the oil pressure which is to be supplied for the clutch hydraulic servo to remain at the pressure of the piston stroke until immediately before the start of the engagement of the clutch, until at least meshing of the backward motion brake is achieved when the backward maneuver is selected and to raise the oil pressure after achievement of meshing with predetermined characteristics.

In order to achieve the second object, the invention provides a control apparatus for an automatic transmission comprising a transmission mechanism to achieve forward maneuver and backward maneuver, a first rotation element which is made to stop by meshing to achieve backward maneuver, a second rotation element to transfer power to the transmission mechanism, a backward motion brake to stop the first rotation element by meshing, and an input clutch to transfer power from the engine to the second rotation element, wherein the backward motion brake is an engagement brake which stops the first rotation element by meshing with the first rotation element when the backward maneuver is selected, the input clutch is a friction clutch having a clutch hydraulic servo and meshes when the backward maneuver is selected, and the control apparatus comprises a second control means which releases the backward motion brake from engagement and which causes the oil pressure which is to be supplied for the clutch hydraulic servo to remain at the pressure of the piston stroke until immediately before the start of the engagement of the clutch, until at least meshing of the backward motion brake is released when the forward maneuver is selected from the condition in which backward maneuver is achieved and to raise the oil pressure after release of meshing with predetermined characteristics.

In order to achieve the third object above, the invention is structured in such a manner that the transmission comprises a third rotation element which is stopped by meshing to achieve forward maneuver and a friction brake to stop by meshing the third rotation element, the forward maneuver of the transmission mechanism is achieved by engagement of the input clutch and stopping by meshing of the third rotation element by the friction brake, and the first control means brings the input clutch to stand-by status by lowering the oil pressure for the clutch hydraulic servo to the pressure of piston stroke until immediately before the input clutch starting engagement when the backward maneuver is selected from the condition in which the forward maneuver is achieved.

In order to achieve the fourth object above, the invention is structured in such a manner that the backward maneuver of the transmission mechanism is achieved by engagement of the backward motion brake and meshing of the input clutch, and the second control means brings the input clutch to stand-by status by lowering the oil pressure for the clutch hydraulic servo to the oil pressure of the piston stroke until immediately before start of engagement of the input clutch.

In order to achieve the fifth object above, the invention is structured in such a manner that the backward motion brake comprises the hydraulic servo and an engagement member which moves against pressure force of a return spring by the motion of the hydraulic servo and engages with a predetermined rotation element, the control apparatus comprises a first determination means which determines completion of motion of the engagement member after start of engagement of the engagement member of the backward motion brake, and the first control means raises the oil pressure as determined by the first determination means.

In order to achieve the sixth object above, the invention is structured in such a manner that the backward motion brake comprises the hydraulic servo and an engagement member which moves against pressure force of a return spring by the motion of the hydraulic servo and engages with predetermined rotation element, the control apparatus comprises a second determination means which determines release of engagement of the engagement member after retreat of the engagement member of the backward motion brake, and the second control means raises the oil pressure as determined by the second determination means.

In order to achieve the seventh object above, the invention is structured in such a manner that the first determination means determines the completion of movement of the engagement member by passage of a first setting time after selection of the backward maneuver, and the first setting time is set from the start of supplying oil pressure to the hydraulic servo of the backward motion brake to the completion of the movement of the engagement member.

In order to achieve the eighth object above, the invention is structured in such a manner that the first determination means comprises an oil pressure sensor provided in an oil path connecting to the hydraulic servo of the backward motion brake and determines the start of engagement when the signals from the oil pressure sensor reaches the oil pressure value corresponding to the motion completion position of the engagement member.

In order to achieve the ninth object above, the invention is structured in such a manner that the second determination means determines the release of meshing of the engagement member by passage of a second setting time after a release of the selection of the backward maneuver, and the second setting time is set from the start of exhaust of the oil pressure for the hydraulic servo of the backward motion brake to the release of the engagement of the engagement member.

In order to achieve the tenth object above, the invention is structured in such a manner that the second determination means comprises a oil pressure sensor provided in an oil path connecting to the hydraulic servo of the backward motion brake and determines the release of engagement when the signals from the oil pressure sensor reach the oil pressure value corresponding to the engagement release position of the engagement member.

With respect to the first object, the oil pressure to be supplied for the hydraulic servo of the input clutch, which is meshed during the backward maneuver accomplishment, is held to be the oil pressure of piston stroke until immediately before the start of meshing of the clutch until engagement of the backward motion brake, hence, engagement of brake is accomplished under the condition where the power from the engine is not transmitted directly to the transmission mechanism. Moreover, after the engagement, meshing of the input clutch is started speedily from the condition of immediately before the start of meshing, and the time required for attaining backward maneuver may be reduced.

Moreover, with respect to the second object, the oil pressure to be supplied for the hydraulic servo of the input clutch, which is meshed during the forward maneuver accomplishment, is held to be the oil pressure of piston stroke until immediately before the start of meshing of the clutch until the release of engagement of the forward motion brake. Hence, release of the engagement of the brake is accomplished under the condition where the power from the engine is not transmitted directly to the transmission mechanism. Moreover, after the achievement of the release of engagement, meshing of the input clutch is started speedily from the condition of immediately before the start of meshing, and the time required to attain forward maneuver may also be reduced.

Furthermore, with respect to the third object, the backward maneuver is surely achieved and the time required for achievement of backward maneuver is reduced when the input clutch for forward maneuver and backward maneuver are the same.

Moreover, with respect to the fourth object, the backward maneuver is surely released and the time required for achieving forward maneuver is reduced when the input clutch for forward maneuver and backward maneuver are the same.

Furthermore, with respect to the fifth object, movement of the engagement member may be completed under the condition where input torque is not transmitted by executing meshing of the input clutch after completion of movement of engagement member of the backward motion brake, hence the backward maneuver is surely released.

Moreover, with respect to the sixth object, the time required until achieving the forward maneuver may be reduced by the sure and accurate release determination of the backward motion brake.

Furthermore, with respect to the seventh object, the structure of the release determination means of the backward motion brake may be simplified.

Moreover, with respect to the eighth object, oil pressure of the position of movement completion of the backward motion brake may be obtained in relation to the spring constant of the return spring. Hence, the start of the engagement of the brake may be surely and accurately determined by detecting the oil pressure.

Furthermore, with respect to the ninth object, the structure of the release determination means of the backward motion brake may be simplified.

Lastly, with respect to the tenth object, oil pressure of the position of engagement release of the backward motion brake may be obtained in relation to the spring constant of the return spring. Hence, the release of the engagement of the brake may be surely and accurately determined by detecting the oil pressure.

BRIEF DESCRIPTION OF THE DRAWINGS

The invention will be described with reference to the figures, in which:

FIG. 2 is an operation chart of the automatic transmission;

DETAILED DESCRIPTON OF THE PREFERRED EMBODIMENTS

Figure 1:
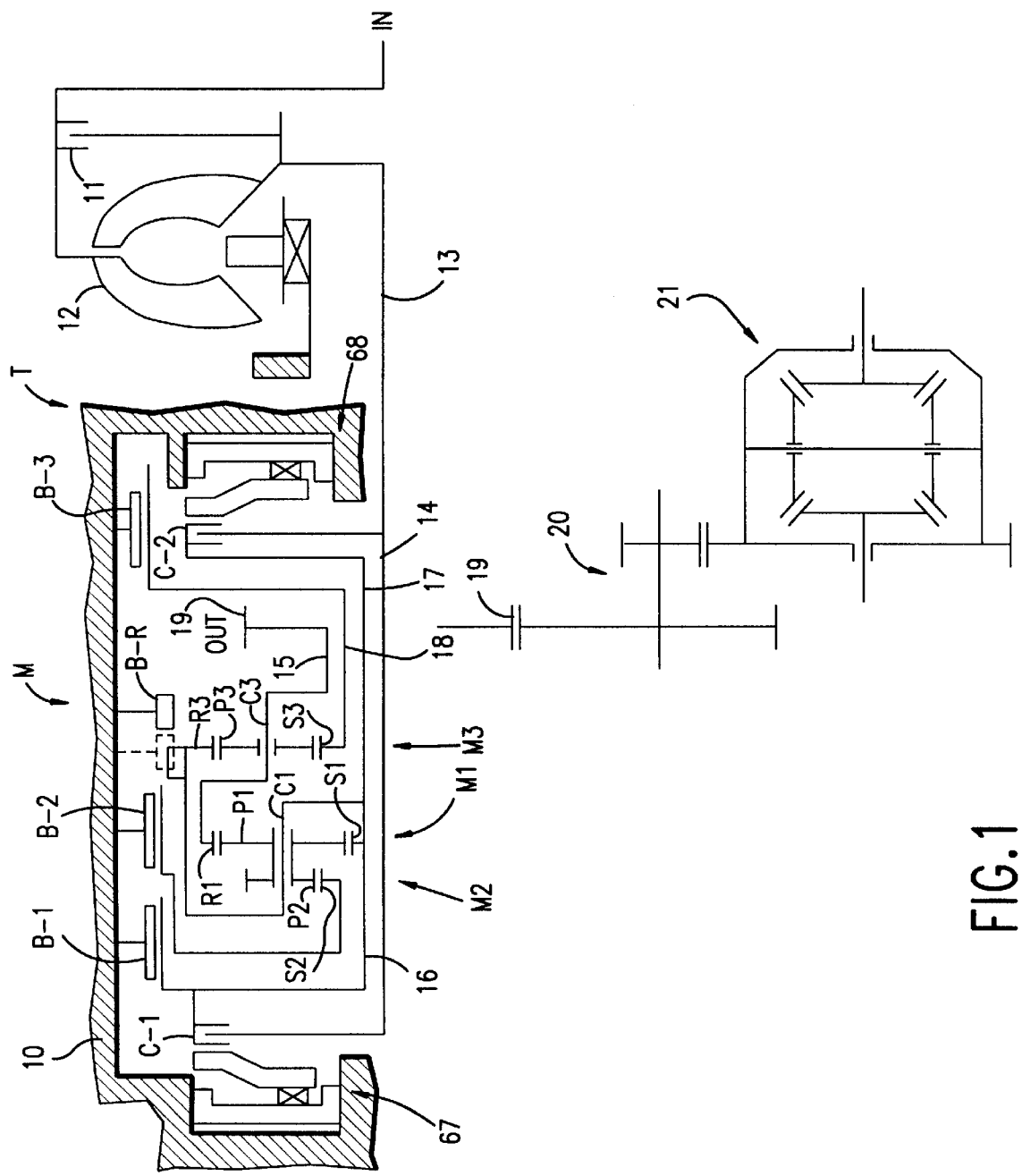
FIG. 1 is a schematic diagram of a transfer apparatus including the automatic transmission of an embodiment to which the control apparatus of the invention is applied.

FIG. 1 portrays the configuration wherein a horizontal structure of a transfer apparatus is structured by combining an automatic transmission, to which the control apparatus of the invention is applied, and a differential apparatus. The transfer apparatus comprises an automatic transmission T, which is composed of a transmission mechanism M having a torque converter 12 equipped with a lock-up clutch 11 to be connected to the engine of the vehicle and a three-step planetary gear set M1, M2 and M3 which change the output of the torque converter 12 into five forward speeds and one backward speed, and a differential apparatus 21 which is connected to the automatic transmission T through a counter gear 20 which also functions as a deceleration mechanism and which transfers the output from the automatic transmission T to the left and right wheels.

Pinion gears P1, P2 with different diameters in both gear sets M1, M2 of the transmission mechanism in the automatic transmission T are directly connected. Ring gears R1 and R3 and carriers C3 and C1 of both gear sets M1 and M3 are connected to each other, and the sun gear S1 and the carrier C1 are connected to the input shaft 14 which is connected to the turbine shaft 13 of the torque converter 12 through respective clutches (C-1, C-2) to function as input elements. Moreover, the sun gear S1, of the gear set M1, is made to be anchored by meshing to the transmission case 10 by means of the brake B-1, the sun gear S2 of the gear set M2 is made to be anchored by meshing to, i.e., engaging with, the transmission case 10 by means of the brake B-2, the sun gear S3 of the gear set M3 is made to be anchored by meshing to the transmission case 10 by means of the brake B-3, and the ring gear R3 connected to the carrier C1 is made to be anchored by meshing to the transmission case 10 by means of the brake B-R.

The sun gear S1 is connected to the clutch C-1 through the sun gear shaft 16 which fits on the outer surface of the input shaft 14, the carrier C1 is connected to the clutch C-2 through the carrier shaft 17 which fits on the outer surface of the input shaft 14, and the sun gear S3 is connected to the brake B-3 through the sun gear shaft 18 which fits on the outer surface of the carrier shaft 17. Further, in this structure, both hydraulic servos 67, 68 of the clutches C-1, C-2 are stationary cylinder type and are arranged in the transmission case 10. In addition, all of the brakes, other than the brake B-R, are band brakes. The brake B-R is an engagement type brake in the invention. Diagrams of the hydraulic servos are omitted. Moreover, the output gear 19, which functions as the output element, is connected to the differential apparatus 21 through the counter gear 20.

Figure 2:
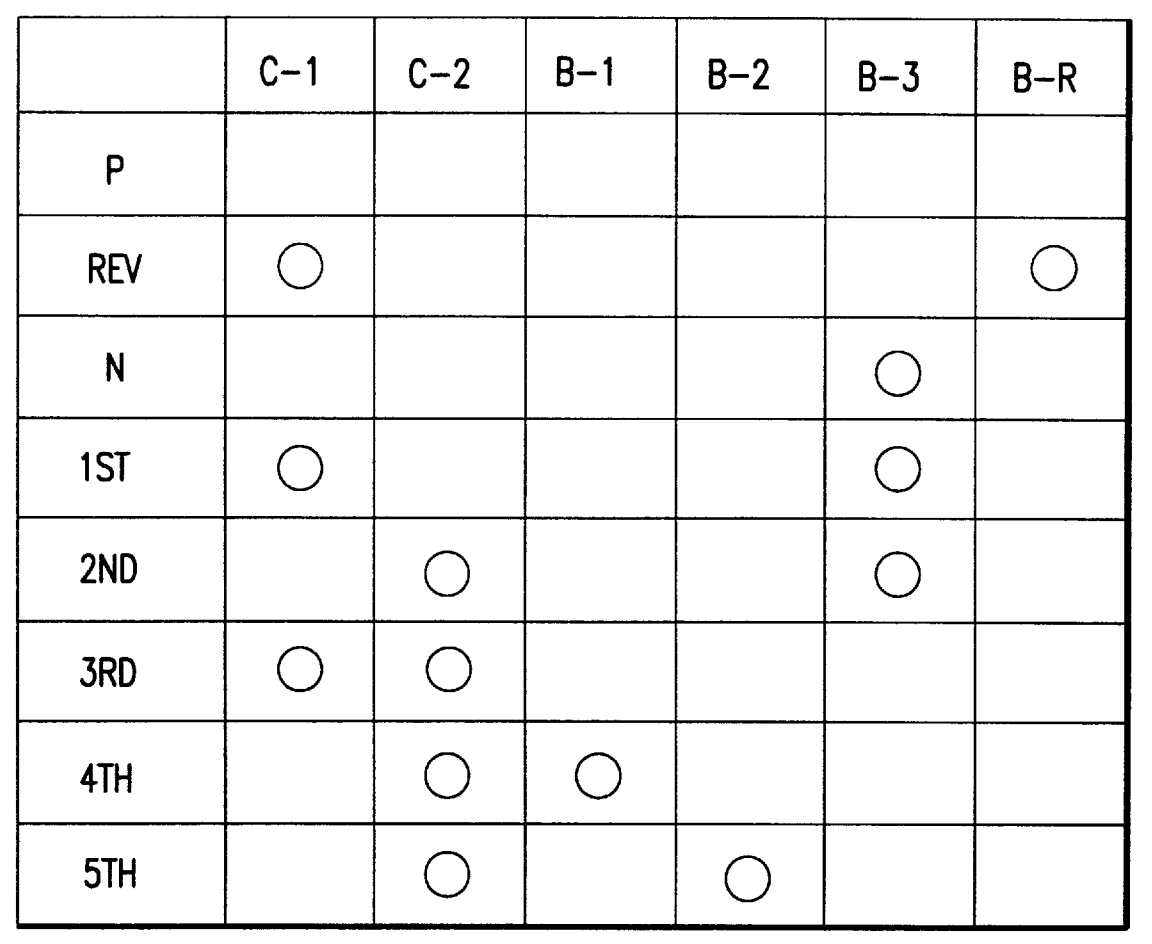

The automatic transmission T thus structured, supplies oil pressure to the hydraulic servos corresponding to each clutch and each brake, and achieves each speed range by meshing (shown by a O mark in FIG. 2) and release (shown with no mark) of each clutch and each brake as shown in FIG. 2, under the control by the electronic control apparatus and the hydraulic control apparatus which will be described later with reference to FIGS. 4 and 5. That is, the first speed range (1ST) is achieved by the meshing of the clutch C-1 and the brake B-3. At this time the rotation of the input shaft 14 enters the sun gear S1 through the clutch C-1, and is output to output gear 19 as a rotation of the carrier C3 which is decelerated the most by stopping by the meshing of the sun gear S3 being meshed with the brake B-3. On the other hand, the second speed range (2ND) is achieved by the meshing of the clutch C-2 and the brake B-3. At this time, the input entering the carrier 17 through the clutch C-2 enters, without change, the ring gear R3 through the carrier C1, and is output to output gear 19 as differential rotation of the carrier C3 with the sun gear S3 as a reaction element which is stopped by being meshed with the brake B-3. The third speed gear (3RD) is achieved by direct connection of the first planetary gear M1 by the meshing of both clutches C-1, C-2. At this time the rotation of the input shaft 14 is output to output gear 19 as a rotation of carrier C3 without change.

The fourth speed range (4TH), and above, of the automatic transmission is designated over-drive and the fourth speed range (4TH) is accomplished by meshing of the clutch C-2 and the meshing of brake B-1 which stops the sun gear S1 by meshing. At this time, the rotation of the input shaft 14 is transferred from the carrier C3 to the output gear 19 as the rotation of the ring gear R1 which is increased by the rotation of the carrier C1 via rotation of the pinion gear P1. On the other hand, the fifth speed range (5th) is achieved by the meshing of the clutch C-2 and the meshing of the brake B-2. At this time, the rotation of the input shaft 14 is transferred from the carrier C3 to the output gear 19 as the rotation of the ring gear R1, which is further increased than during achievement of the fourth speed range by the rotation of carrier C1 via the pinion gear P2, with a small diameter and which opposes the sun gear S2.

Moreover, the backward speed range (REV) is achieved by the meshing of the clutch C-1 and the brake B-R. At this time, the rotation of the carrier C1 is stopped by anchoring of the ring gear R3 to the case 10 by meshing of the brake B-R against the input to the sun gear S1 through the clutch C-1, and the rotation of the ring gear R1 which is decelerated by the reverse rotation caused by the rotation of the pinion gear P1 is output from the output gear 19 through the carrier C3.

In the automatic transmission thus structured, application of the invention includes the ring gear R3 as the first rotation element to be stopped by meshing for achieving the backward maneuver, the brake B-R as a backward motion brake to stop the ring gear R3 by meshing, the brake B-3 as the friction meshing element capable of stopping rotation of the ring gear R3 during neutral position, the sun gear S3 as the second rotation element, the sun gear S1 as the third rotation element, and the clutch C-1 as the friction clutch which inputs power to the sun gear S1, as described above. The brake B-3 is originally provided to achieve the first speed and the second speed as described above, but the brake B-3 operates to stop the rotation of the ring gear R3 indirectly when stopping by meshing with the sun gear S3 engaged with the pinion gear P3, which is common to the ring gear R3, thus prohibiting the autorotation of the pinion gear P3. Furthermore, as shown in detail in FIG. 3, the backward motion brake B-R is made to be an engagement-type brake which anchors the ring gear R3 on the case 10 by engaging with the ring gear R3. A meshing means, which stops the ring gear R3 by meshing the brake B-3, until at least achievement of engagement of the backward motion brake B-R when the backward maneuver, reverse, is selected as a means to control the brake B-R and the brake B-3 together with the friction clutch C-1, is provided in the embodiment as the circuit in the oil pressure control apparatus, shown in FIG. 5, and a program in the electronic control apparatus, of FIG. 4, which controls the circuit by electric signals.

Figure 3:
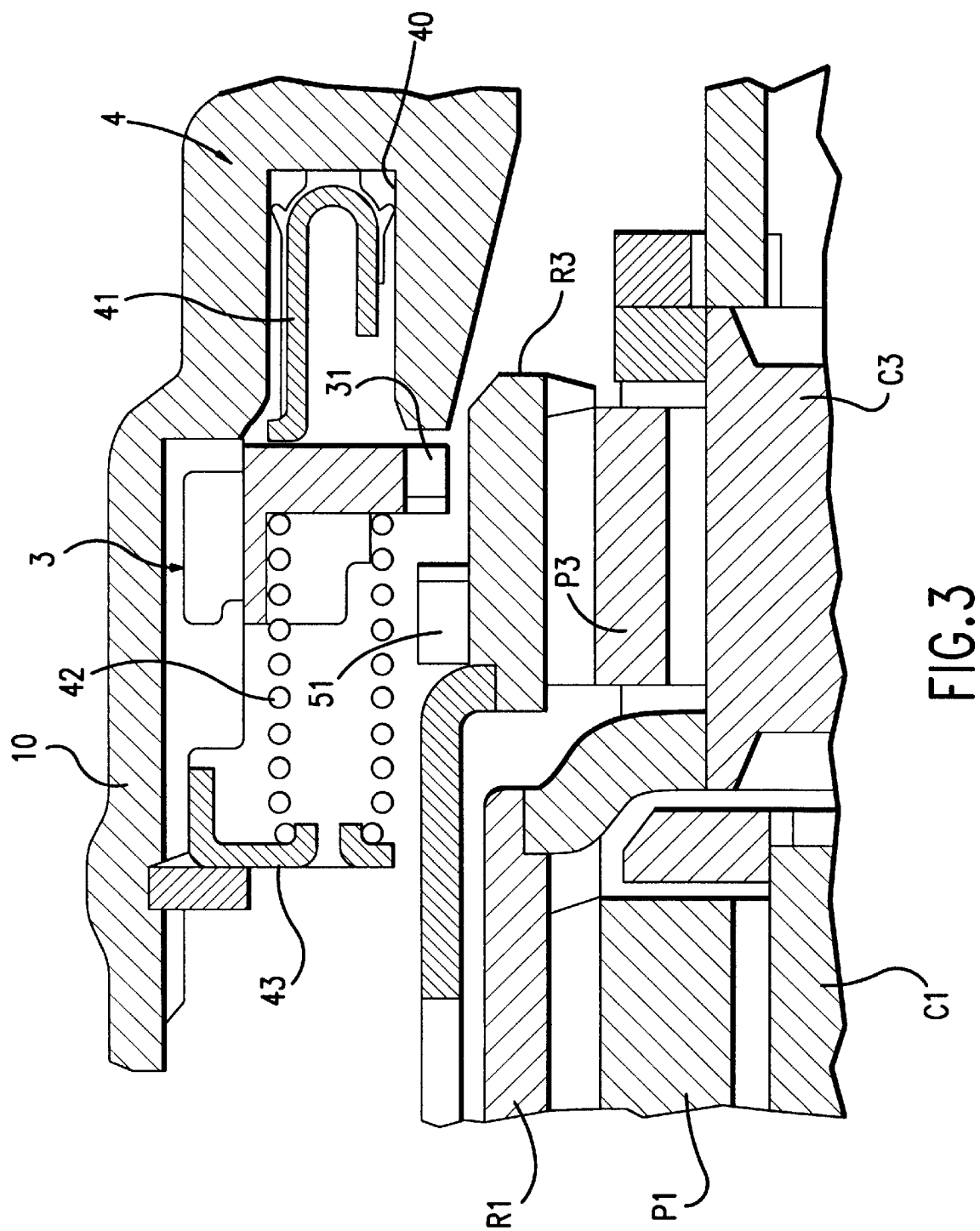
FIG. 3 is a partial cross-section of an engagement-type brake of the automatic transmission.

As shown in detail in FIG. 3, the engagement-type brake B-R comprises an engagement member 3 and the hydraulic servo 4. The engagement member 3 is a ring-shaped member which is slidably-guided into the case 10 by a spline fitting with the outer surface and is capable of moving in an axial direction as defined by the input shaft 14, and the inner surface engagement teeth 31, which engage with the outer surface engagement teeth 51 of the ring R3, is formed on the inner surface of the engagement member 3. The hydraulic servo 4 comprises a hydraulic cylinder, formed in a ring shape in the step section of the case 10, a ring-shape piston 41 with a J-shape cross section which is made of press material fitted into the hydraulic cylinder 40 in such manner that the pressed material slides freely in the direction of the shaft, and the return spring 42 with one end being snap-ring anchored on the case 10 by means of a spring sheet 43 and the other end being contact-supported by the engagement member 3, which loads a returning power on the engagement member 3. Moreover, the engagement member 3 is attached to the tip of the piston 41. On the other hand, the outer surface engagement teeth 51 of the ring gear R3 are structured as teeth protruding in the direction of the outer diameter from the outer surface of the ring gear R3.

Next, the brake B-3, which is a friction meshing element, is made to be a normal band brake as explained before with reference to FIG. 1, although a detailed illustration is omitted. Hence, the brake B-3 comprises a band supported on the case 10 side and a drum connected to the sun gear S3 through the sun gear shaft 18, and has the hydraulic servo 69, see FIG. 5, which meshes with and fastens the band with the drum.

Figure 5:
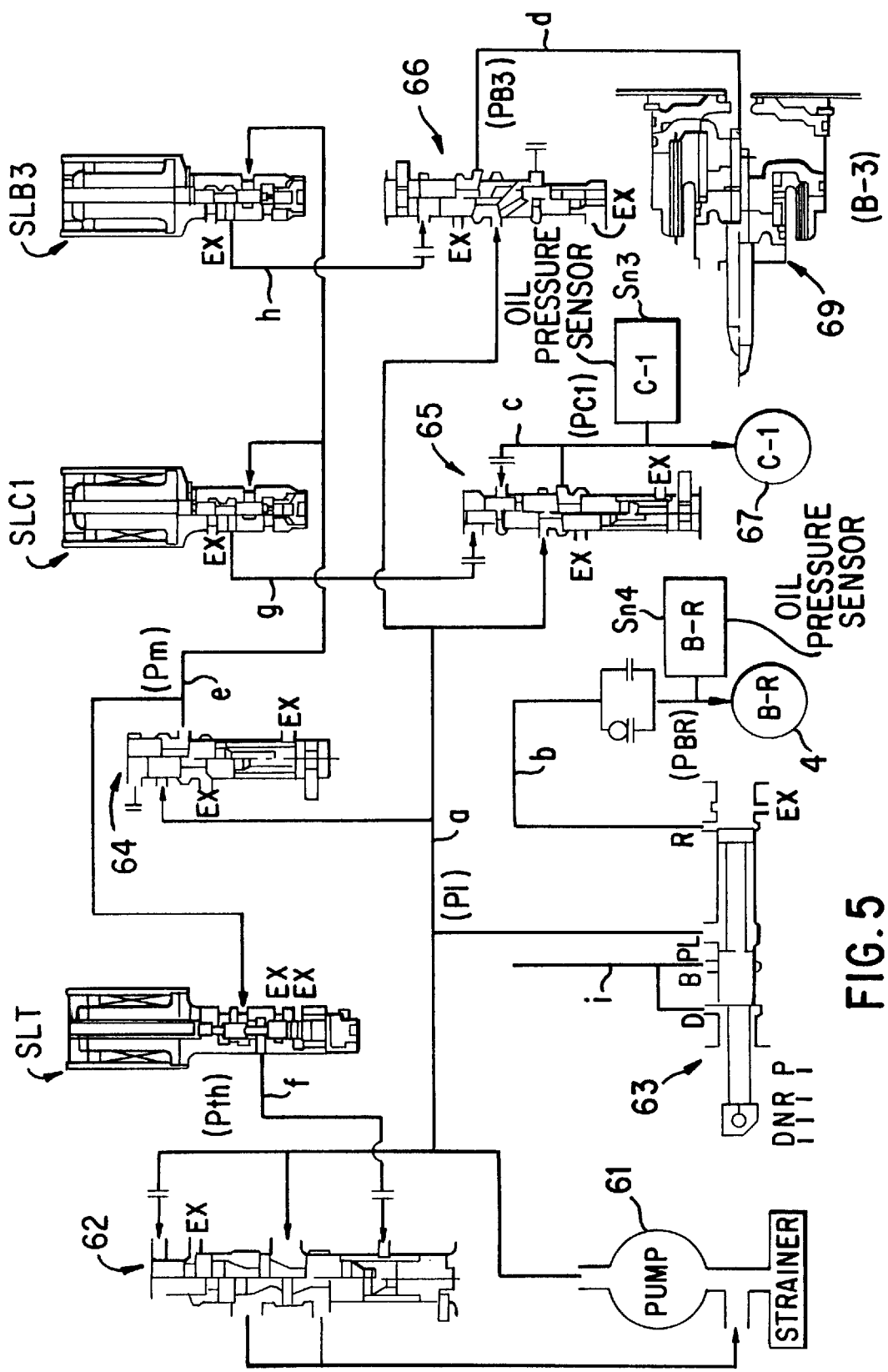
FIG. 5 is a partial circuit diagram showing the oil pressure circuit of the automatic transmission.

FIG. 5 shows a circuit section which relates to the control according to the invention in the hydraulic control apparatus of the automatic transmission T. The circuit has a pump 61 which ejects oil as a result of being driven by the turbine shaft 13 of the torque converter 12, shown in FIG. 1, as the oil pressure source, and comprises the friction clutch C-1, the engagement brake B-R, and a control circuit which supplies oil pressure to each hydraulic servo 67, 4, 69 of the band brake B-3. Arranged in the circuit are a manual valve 63, which is operated manually, pressure regulator valves 62, 64, 65 and 66 which operate hydraulically, and linear solenoid valves SLT, SLC1, SLB3 which are operated by solenoids.

A primary regulator valve 62, equipped with a spring loaded spool, is connected to the line pressure oil path (a) leading to exit side of the pump 61. In the valve 62, a throttle pressure (Pth), to be explained later, is applied to the spring load side of the spool while a line pressure (Pl) is fed back and applied to the opposite side. The required oil pressure corresponding to the vehicle load (normally, computed based on the vehicle speed and the throttle opening level) is achieved by draining the line pressure (Pl) attached to the suction side of the pump 61.

A manual valve 63, equipped with a spool which is switched according to the shift position, is connected to the line pressure (Pl) oil path (a). The valve 63 plays the role of connecting the line pressure oil path (a) to the D range oil path (i) or to the R-range oil path (b) by a switching of the spool. Similarly, the solenoid modulator valve 64 is connected to the line pressure oil path (a) and the valve 64 plays a role of reducing and outputting the line pressure (Pl) as the modulator pressure (Pm) to the modulator pressure oil path (e), with the feedback pressure being applied to the opposite side of the spool which is spring loaded.

Each linear solenoid valve is connected to the modulator pressure oil path (e). The linear solenoid valve SLT is a pressure regulator valve which displaces the spool and outputs the solenoid pressure (Pth) based on the duty signal applied to the linear solenoid, and the output is applied to the spring load side of the primary regulator valve 62 through the throttle pressure oil path (f). Likewise, the linear solenoid valve SLC 1 is also made to be a pressure regulator valve and is structured in such manner that the solenoid pressure is applied to C-1 control valve 65 through the solenoid pressure oil path (g). The linear solenoid valve SLB 3 is also a pressure regulator valve and is structured in such manner that the solenoid pressure is applied to B-3 control valve 66 through the solenoid pressure oil path (h).

The C-1 control valve 65, which is connected to the line pressure oil path (a), is a spool shape pressure regulator valve and plays the role of regulating pressure of oil pressure (Pcl) of the supply oil path (c) leading to the hydraulic servo 67 for friction clutch C-1 after the solenoid pressure of the solenoid pressure oil path (g) is applied against the spring load and after the feedback pressure is applied to the radius unit. Likewise, B-3 control valve 66, which is connected to the line pressure oil path (a), is a spool shape pressure regulator valve and plays a role of regulating the oil pressure (Pb3) of the supply oil path (d) leading to the hydraulic servo 69 after the solenoid pressure of the solenoid pressure oil path (h) is applied against the spring load and after the feedback pressure is applied to the radius unit in the direction of spring load. Oil pressure is supplied to the hydraulic servo 4 for brake B-R connected to the R range oil path (b) through an orifice with a reverse flow stop valve.

Figure 4:
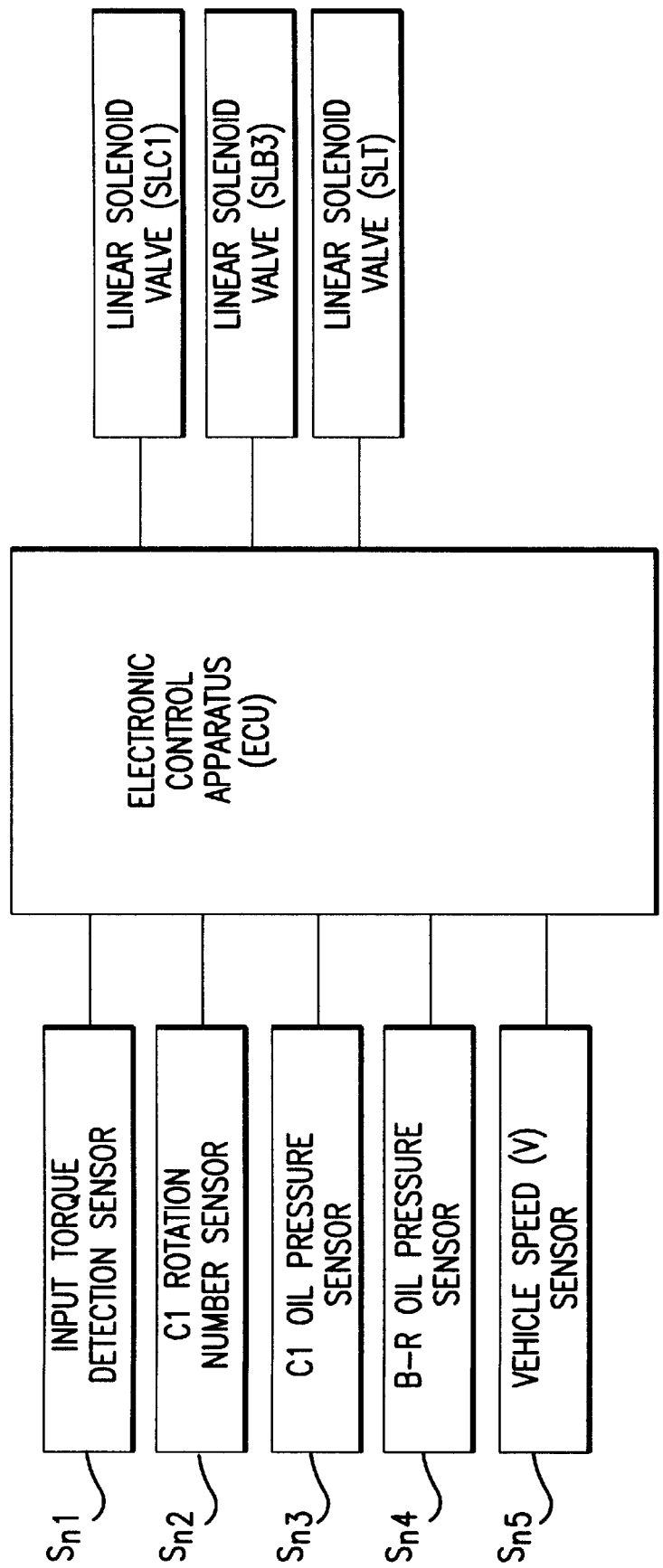
FIG. 4 is a block diagram of the electronic control apparatus and its input/output relationship to the automatic transmission.

FIG. 4 shows the electronic control apparatus (ECU) which controls the automatic transmission and the relationship between input and output relative to the control apparatus. As shown in FIG. 4, the electronic control apparatus has an input torque detection sensor Sn1, a clutch C-1 rotation number sensor Sn2, a C-1 oil pressure sensor Sn3 which is arranged in the oil pressure circuit, a B-R oil pressure sensor Sn4 which is also located in the oil pressure circuit and a vehicle speed sensor Sn5 as the input means, and each of the linear solenoid valves SLC1, SLB3, SLT in the oil pressure control apparatus as the output means. The electronic control apparatus controls the friction clutch C-1, the engagement brake B-R and the band brake B-3 by applying the electronic signals to each of the linear solenoids to control each hydraulic servo through the oil pressure control apparatus.

Figure 6:
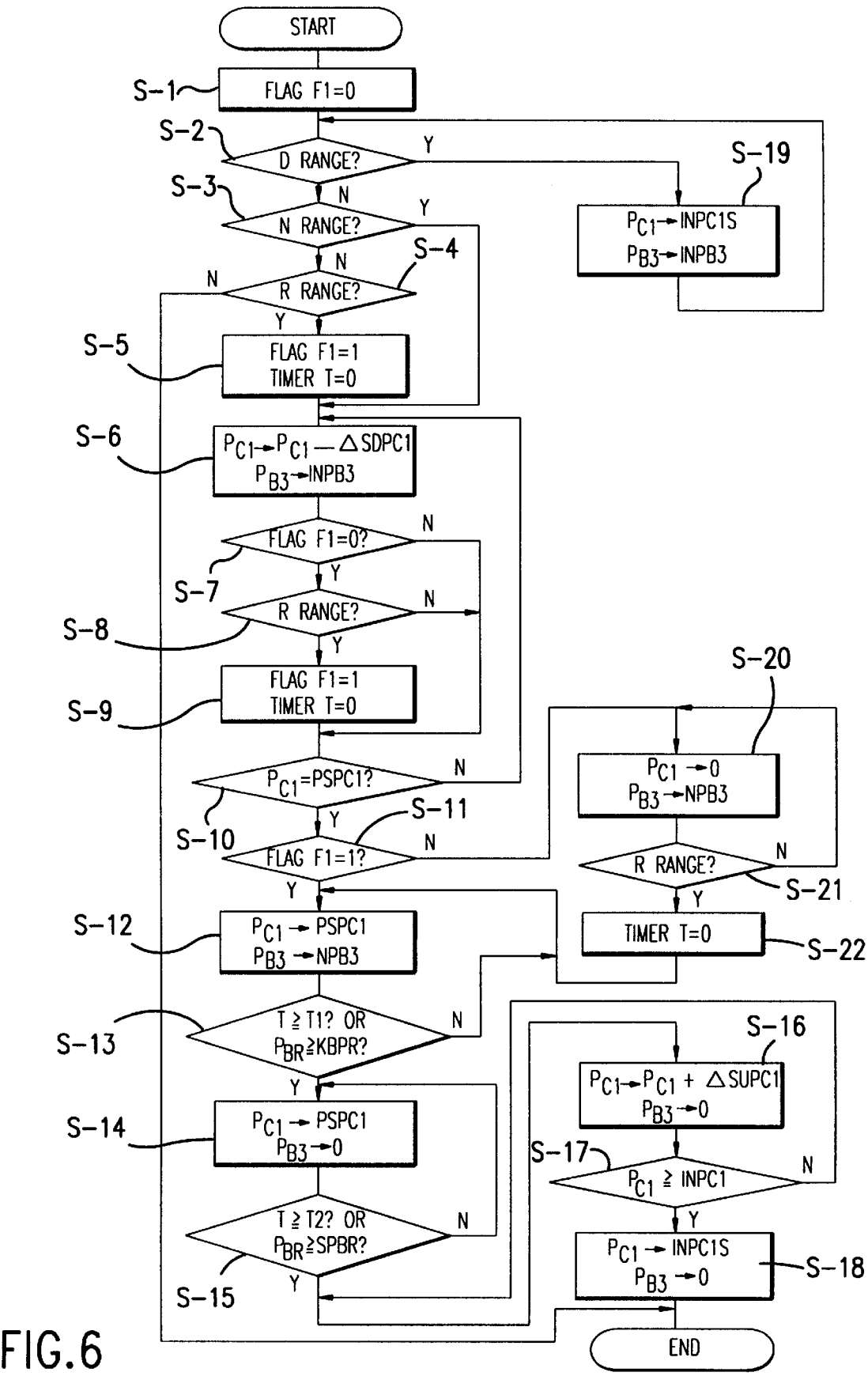
FIG. 6 is a flow chart of the control operation during D→N→R shift by the control apparatus of the invention.

The apparatus structured in the above manner is controlled according to a first control means which comprises a program within the electronic control apparatus and the control flow of a second control means. FIG. 6 is a flowchart of the gear shift starting from D range through the neutral range (N) to R range (hereafter, simply D→N→R shift). The relationship between shift operation and control flow will be described with reference to the flowchart of FIG. 6 and time charts of FIGS. 7 and 8.

Figure 7:
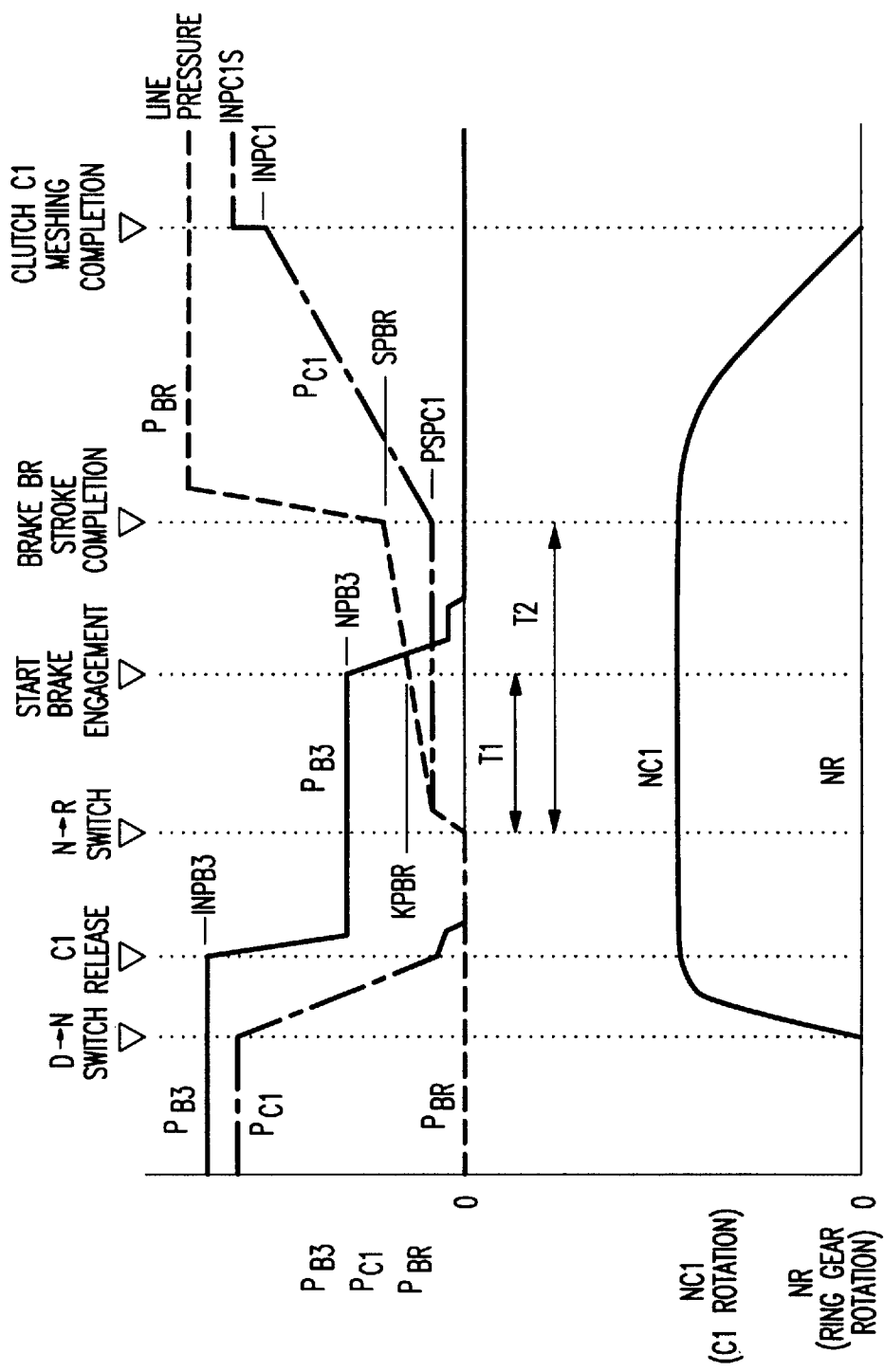
FIG. 7 is a time chart showing the change in the oil pressure of each hydraulic servo and the change in the number of rotations of the input clutch and the brake during the D→N→R shift.
Figure 8:
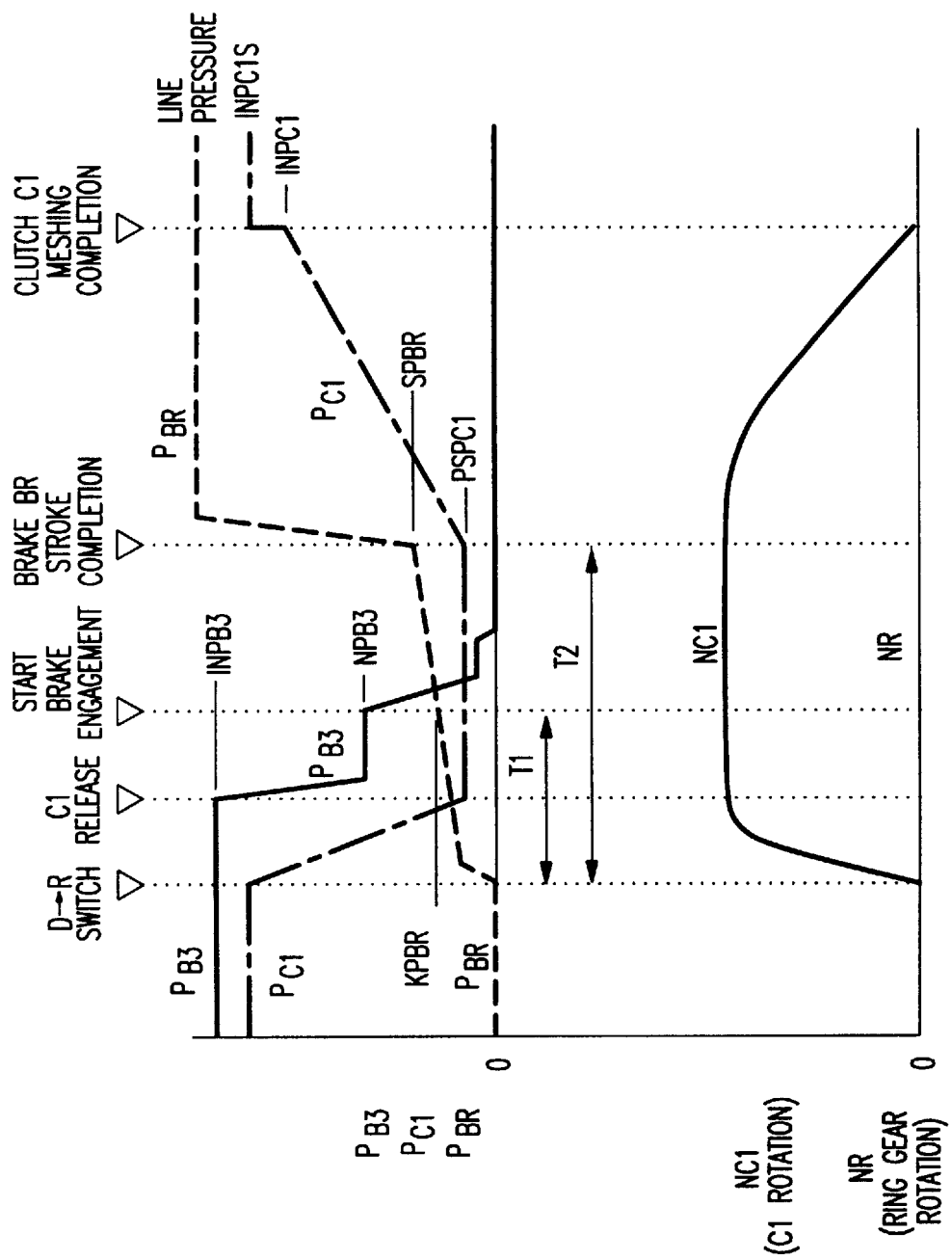
FIG. 8 is a time chart showing the change in oil pressure of each hydraulic servo and the change in the number of rotations of the input clutch and the brake during D→R short time shift.

At the start of the control, the D range is selected, the supply pressure (Pc1) of the clutch C-1 denoted by the dot-dash line in the time charts of FIGS. 7 and 8, assumes the value (INPC1S), the supply pressure (Pb3) of the brake B-3 denoted by the solid line assumes the value (INPB3), the backward motion brake pressure (Pbr), denoted by the dashed line, is 0, the clutch rotation number (NC1) is 0 indicating a meshing condition, and the ring gear rotation number (NR) is 0 indicating a condition wherein rotation of the sun gear S3 is stopped by meshing of the brake B-3 for which the brake pressure (Pb3) is supplied. At this time, in the flowchart, the D range determination which is executed based on the signals from the neutral start switch which is always present in the automatic transmission during the step S-2, following a process to clear R range flag F1 in step S-1, is YES. Hence the program moves to step S-19 where the supply pressure (Pc1) for the hydraulic servo 67 of the clutch C-1 is set for the supply pressure value (INPCLS) corresponding to the input torque so that the meshing is maintained even though some fluctuation occurs in the input torque. Then, the process of setting the supply pressure (Pb3) for the hydraulic servo 69 of the brake B-3 to supply oil pressure (INPB3) for the hydraulic servo 69 during D range, or equivalently, to provide an oil pressure barely enough to maintain the speed range against input torque is repeated.

In this condition, when D range determination becomes NO and the N range determination becomes YES, at step S-3, with a shift operation by the driver, the D→N switch shown in FIG. 7 starts and the clutch pressure lowering process is executed at step S-6. During this process, a process to lower the oil pressure Pc1 with a predetermined slope, indicated by the dot-dash line in FIG. 7, by reducing the predetermined value (DSDPC1) at each predetermined time interval for a gradual lowering of oil pressure in order to release the supply pressure (Pc1) for clutch C-1 from the initial supply pressure (Pc1) to stand-by condition of clutch C-1 and a process to maintain the supply pressure (Pb3) to brake B-3 at the oil pressure (INPB3) are executed. As a result, the number of rotations of clutch C-1 rises to the value (NC1) with release. On the other hand, brake B-3 continues to stop the sun gear S3 with a weakened meshing power, and the number of rotations of the ring gear R3 is held at 0.

At step S-7, a determination of R range flag F1 is YES because of clearing (0) of the flag F1 in step S-1. Hence, the R range determination is executed again at step S-8. This determination becomes negative NO. Hence, step S-9 is skipped and the loop starting at the clutch pressure lowering process is repeated until the clutch C-1 release determination becomes YES at step S-10. The oil pressure value (PSPC1) here is barely enough to complete the piston stroke of the hydraulic servo 67 (in this case, the operation becomes an operation to return clutch C-1 to stand-by position, hence creation of the return stroke of the piston is not started) and is set corresponding to the return spring load. This determination becomes affirmative through comparison with the detection value (Pc1) by the C-1 oil pressure sensor Sn3. In this case, the determination of the R range flag F1 at step S-11 remains NO as before, hence the total release process (Pc1→0) of clutch C-1 is executed at step S-20. This process is repeated until the determination of R range becomes YES and N→R switch takes place at step S-21.

Here, when the R range shift is executed, the R range determination becomes YES at step S-21 due to the switching of the neutral start switch, hence the N→R switch, shown in FIG. 7, is started, the timer reset (T=0) at step S-22 and the clutch stand-by process of step S-12 starts. The process raises the supply pressure (Pc1) for clutch C-1 to the oil pressure value (PSPC1) and to achieve the stand-by condition of piston stroke completion or, equivalently, the condition immediately before the start of the meshing of the clutch C-1. Concurrently with this process, the supply of line pressure to the engagement brake B-R through the orifice is started as a result of switching the manual valve 63 to the R range position, and the pressure of the hydraulic servo 4 (Pbr) begins to rise gradually with the start of the piston 41 stroke.

In step S-13, it is determined whether to start brake engagement based on a timer elapsing determination (T≧T1) or by a backward motion brake oil pressure rising determination (Pb≧KPBR). Here T1 is a time barely sufficient to start engagement of the brake B-R, or a time until the piston 41 reaches the engagement starting stroke position while the oil pressure value (KPBR) is an oil pressure barely sufficient to start the engagement of brake B-R and is set based on the spring constant of the return spring 42 and the engagement start stroke amount, and is detected by B-R oil pressure sensor Sn4. This determination is looped until it becomes YES. Meanwhile, the oil pressure (Pb3) of the brake B-3 is maintained at the value (NPB3) during this time and the ring gear R3 is held stopped by meshing, enabling smooth engagement of the brake B-R.

When the determination at step S-13 becomes YES, the brake engagement, shown in FIG. 7, starts, and brake pressure release process (Pb3→0) is executed at step S-14. This process also loops until a timer elapse determination or a backward motion brake oil pressure rising determination, which makes up brake stroke completion determination at step S-15, becomes YES. Here, the timer value T2 is barely sufficient to complete the stroke of the brake B-R and, in fact, is the first setting time in the invention and is the time until the completion of the stroke of piston 41. Moreover, the oil pressure (SPBR) is barely sufficient to complete the stroke of the brake B-R and may be set the same as the oil pressure value (KPBR). The next step S-16 is a process to raise the clutch pressure PC1. An additive value (ΔSUPC1) in this process is a predetermined value to raise the oil pressure gradually in order to mesh the clutch C-1 and is added to the initial value (Pc1) at each predetermined time interval thereby causing the oil pressure to rise with a predetermined slope. On the other hand, the supply pressure for the brake B-R rises rapidly due to a pressure accumulation effect resulting from completion of the piston stroke of the hydraulic servo 4, ultimately reaching the line pressure. Moreover, the clutch meshing completion determination is executed at step S-17 as a result of comparison of clutch pressure Pc1 with the oil pressure value (INPC1) detected by the C-1 oil pressure sensor Sn3. Finally the control operation is completed with the supply pressure (Pc1) for the clutch (C-1) being returned to the oil pressure value (INPC1S) by the backward maneuver maintenance process at step S-18.

On the other hand, in the case of a quick shift operation causing the N range determination to be NO at step S-3, the R range determination becomes YES at step S-4 and the D→R switch shown in FIG. 8, is established, enabling execution of the R range flag setting (F1=1) and the timer reset process (T=0). Moreover, the clutch pressure lowering process is executed at step S-6 as in the case described above. In this case, if the determination of R range flag is NO at step S-7 because the flag is already established at step S-5, the process continues to be executed until the clutch C-1 release determination becomes YES at step S-10 like the above case. Furthermore, when the clutch C-1 release determination becomes YES, the R range determination becomes YES at step S-11 and, in this case, the clutch stand-by process is executed directly at step S-12. The flow from step S-13 on is the same as the case of D→N→R shift described above.

Figure 9:
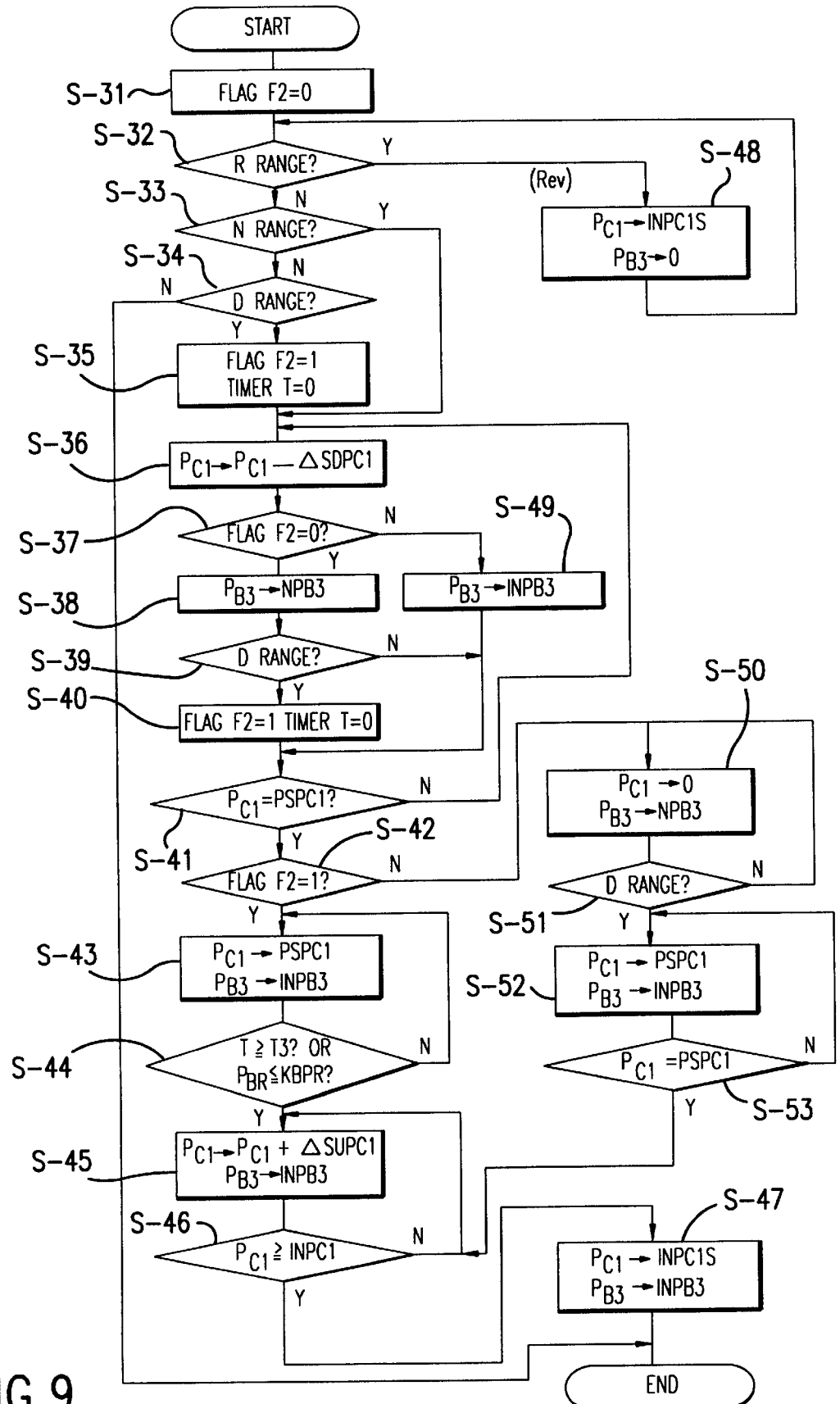
FIG. 9 is a flow chart showing the control operation during R→N→D shift by the control apparatus of the invention.
Figure 10:
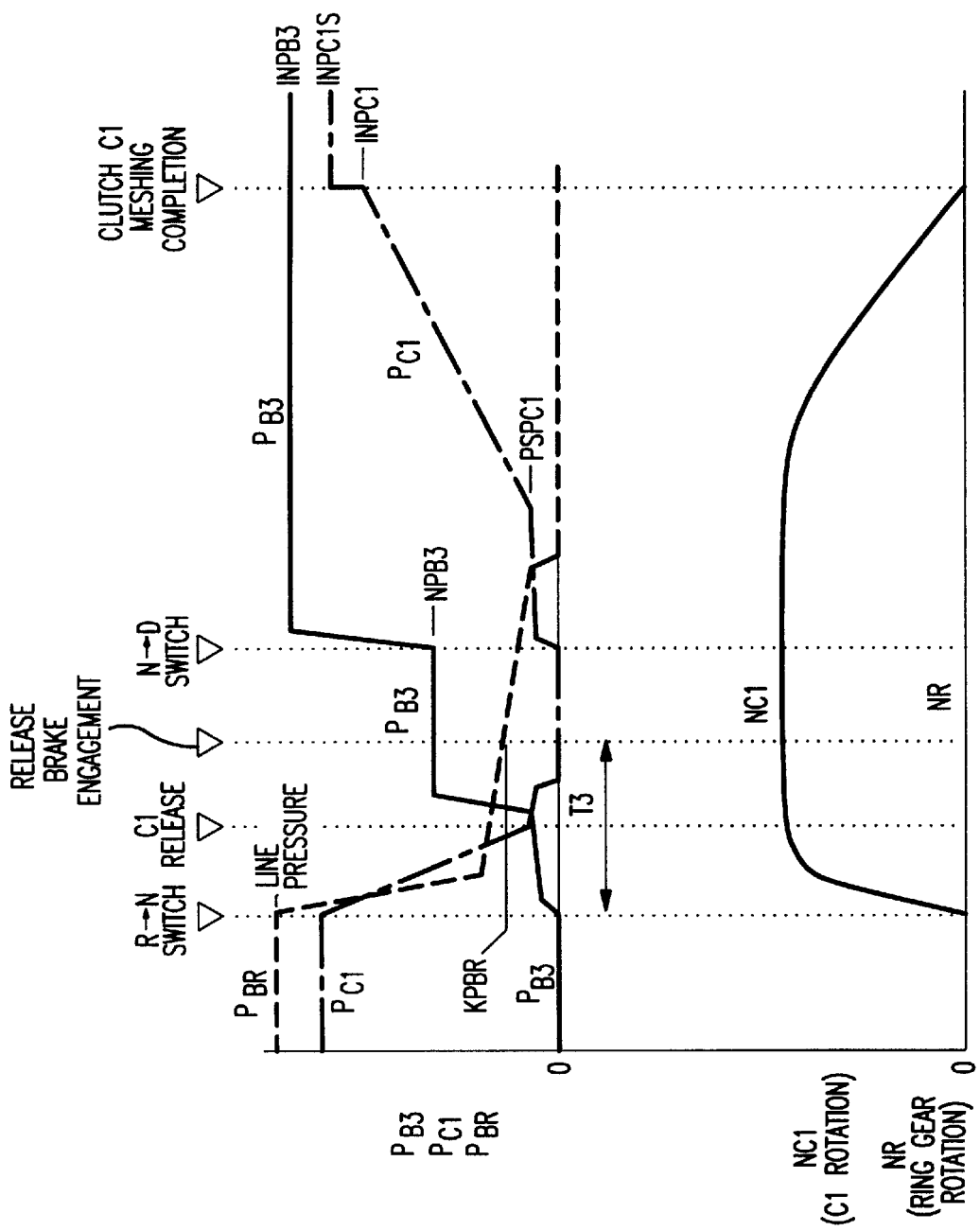
FIG. 10 is a time chart showing the change in the oil pressure of each hydraulic servo and the change in the number of rotations of the input clutch and the brake during R→N→D shift.
Figure 11:
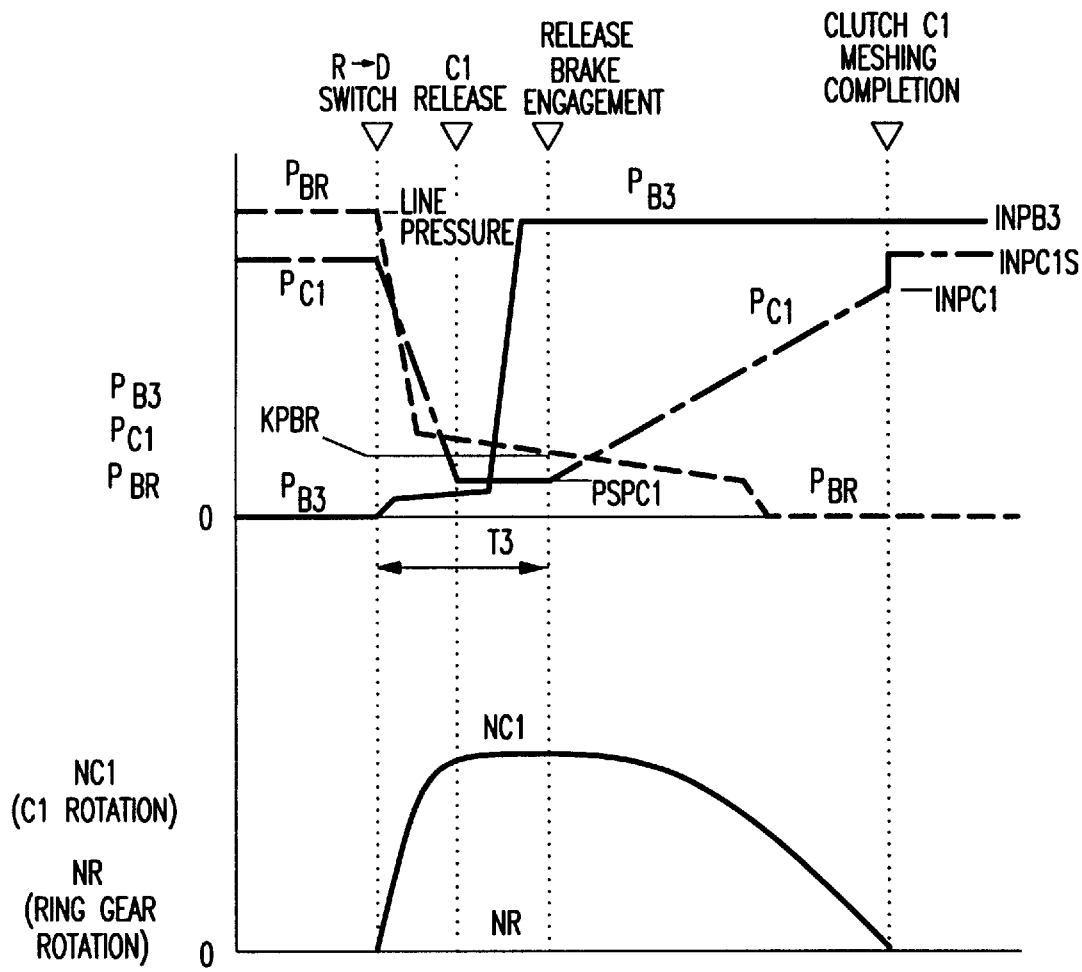
FIG. 11 is a time chart showing the change in the oil pressure of each hydraulic servo and change in the number of rotations of the input clutch and the brake during R→D short time shift.

Next, FIGS. 9–11 are directed to the control process for R→N→D shift which is the reverse of the above described shift and is executed by the second control means. At the start of the control, R range is selected, the supply pressure (Pc1) of the clutch C-1 denoted by dot-dash line in the time charts of FIG. 10 and FIG. 11 assumes the value (INPC1S), the supply pressure (Pb3) of the brake B-3 denoted by the solid line, assumes the value 0, the backward motion brake pressure (Pbr) denoted by dotted line is the line pressure, the clutch rotation number (NC1) is 0 indicating a meshing condition, and the rear gear rotation number (NR) is 0 indicating a condition wherein stopping of the brake B-R by meshing for which the backward motion brake pressure (Pb3) is supplied. At this time, at step S-32, the R range determination, which is executed based on the signals from the neutral start switch, becomes YES following a process to clear the D range flag F2 in step S-31. Hence the program then moves to step S-48 where the process is repeated to make the supply pressure (Pc1) for the hydraulic servo 67 the supply pressure value (INPC1S) and to make the supply pressure value (Pbs) for the hydraulic servo 69 be 0.

In this condition, when the R range determination becomes NO and N range determination becomes YES at step S-33 with shift operation by the driver, the R→N switch shown in FIG. 10 starts. In fact, the clutch pressure lowering process is executed at step S-36. During this process, a process to lower the oil pressure Pc1 with a predetermined slope, indicated by the dot-dash line in FIG. 10, by reducing by a predetermined value (ΔSDPC1) at each predetermined time interval to gradually lower the oil pressure in order to release the supply pressure (Pc1) for clutch C-1 from the initial supply pressure (Pc1) to the stand-by condition of the clutch C-1 is executed. At this time, the supply pressure (Pbr) of the backward motion brake B-R drops sharply at the beginning due to a draining resulting from switching the manual valve 63 to the N range position. However, due to creation of a return stroke of the piston, the subsequent decline of the oil pressure becomes more gradual.

At the next step S-37, the determination of D range flag F2 is YES because of the clearing (0) of the flag F2 in the beginning step S-31. Hence, a process to raise the supply pressure for the brake B-3 to the oil pressure (NPB3) is executed at step S-38. Moreover, the D range determination is executed at step S-39. This determination is NO at this time. Hence, the next step S-40 is skipped and the loop starting at the clutch pressure lowering process is repeated until the clutch C-1 release determination becomes YES at step S-41. Determination of the D range flag F2 at step S-42 is NO as before, hence the total release process (Pc1→0) of clutch C-1 is executed at step S-50. This process is repeated until the determination of the D range becomes YES at step S-51. As a result of this process, the number of rotations (NC1) of the clutch C-1 rises to the number of rotations of the release condition. On the other hand, the number of rotations of the ring gear R3 is maintained at 0.

Here, when the D range shift is executed, the D range determination becomes YES at step S-51 due to the switching of the neutral start switch, hence the N→D switch, shown in FIG. 10 is started, and the clutch C-1 stand-by process of step S→52starts. This raises the supply pressure (Pc1) for the clutch C-1 to the oil pressure value (PSPC1) and raises the supply pressure for the brake B-3 to the oil pressure value (INPB3). The processing is repeated until the determination is made that the oil pressure value (PSPC1) is reached at step S-53. When the clutch C-1 release determination becomes YES at step S-53, the clutch pressure rising process is executed at step S-45 and the program waits for the clutch C-1 meshing completion determination to become YES at step S-46. In this process, the number of rotations of the clutch C-1 decreases with meshing. When this determination becomes YES, the process to maintain the meshing of the clutch and the brake B-3 is executed and the control process is completed.

On the other hand, in the case of the quick shift operation causing the N range determination to be NO at step S-33, the D range determination becomes YES at step S-34 and the D→R switch, shown in FIG. 11, is established, enabling the execution of the R range flag setting (F2 =1) and timer reset process (T=0). Moreover, step S-36 is executed as described above. In this case, the determination of the negative R range flag at step S-37 becomes NO because the flag is has been established at step S-35, hence step S-49 is executed as in the case above, and the supply pressure (Pb3) for the brake B-3 is raised immediately to the oil pressure value (INPB3). Further, when the brake engagement release determination becomes YES at step S-41, the determination of the D range flag F2 is executed at step S-42, and the processes starting with step S-43 are executed because the brake engagement release determination becomes YES. The process at step S-43 is the same as the process at step S-52. The next step S-44 is a brake engagement release determination. This determination is executed by timer elapsing determination (T≧T3) or by backward motion brake oil pressure falling determination (Pbr≧KPBR). Here T3 is a time sufficient to start the engagement of the brake B-R, while the oil pressure value (KPBR) is an oil pressure barely sufficient to start the engagement of the brake B-R and is set based on the spring constant of the return spring 42 and the engagement release stroke amount and is detected by the B-R oil pressure sensor Sn4. Flows from this point on are the same as the case of R→N→D shift above.

As described above, in the control apparatus of the embodiment, the input clutch C-1 which transfers the power from the engine to the sun gear S1 during achievement of both the forward maneuver (drive) and the backward maneuver (reverse) is made to be controlled directly by the electronic control apparatus without relying on the switching position of the manual valve 63 in the oil pressure control circuit, and the supply pressure (Pc1) of the input clutch C-1 is controlled to maintain a stand-by condition until completion of the piston stroke during D→R shift and R→D shift. Hence, the engagement and the releasing engagement of the engagement brake B-R is enabled under a condition where the power from the engine is not directly transferred to the transmission mechanism M. This makes sure that the operations of the engagement brake B-R are executed without fail. Moreover, because, after the completion of these operations, the meshing of the input clutch C-1 is started quickly from the condition immediately before meshing, which enables a reduction in the time required for the achievement of both the forward maneuver and the backward maneuver as much as possible, which in turn, improves the response of the shift where D→R shift and R→D shift frequently occur.

Moreover, particularly in a configuration where the engagement stroke completion determination and engagement release determination of the engagement brake B-R are executed by the timer T2 and the timer T3, the structure may be simplified without requiring a special detection means for the determination. Furthermore, in a configuration where these determinations are made based on the detected values of the B-R oil pressure sensor Sn4, determination of the operation of the engagement brake B-R may be executed more accurately from the displacement of the spring by setting the comparison values (SPBR, KPBR) in conjunction with the spring constant of the return spring 42.

The invention has been described as being applied to an automatic transmission equipped with specific transmission mechanism. However, application of the invention may not be limited to the transmission described in the embodiment above, but the invention may be applied to various transmission mechanisms, and various modifications to actual structure may be created within the scope of the descriptions presented.

What is claimed is:

1. A control apparatus for an automatic transmission, comprising:

a transmission mechanism to achieve forward maneuver and backward maneuver;

a first rotation element which is stopped by meshing to achieve a backward maneuver;

a second rotation element to transfer power to the transmission mechanism;

a backward motion brake to stop the first rotation element by meshing; and an input clutch to transfer power from the engine to the second rotation element, wherein the backward motion brake is an engagement brake which stops the first rotation element by meshing with the first rotation element when the backward maneuver is selected, the input clutch is a friction clutch having a clutch hydraulic servo to which oil pressure is supplied when the backward maneuver is selected, and the control apparatus comprises a first control means which causes the oil pressure for the clutch hydraulic servo to remain at a predetermined pressure until immediately before the start of the engagement of the friction clutch, until at least meshing of the backward motion brake is achieved when the backward maneuver is selected and to raise the oil pressure after achievement of meshing with predetermined characteristics.

2. A control apparatus for automatic transmission, comprising:

a transmission mechanism to achieve forward maneuver and backward maneuver; a first rotation element which is stopped by meshing to achieve a backward maneuver;

a second rotation element to transfer power to the transmission mechanism;

a backward motion brake to stop the first rotation element by meshing; and an input clutch to transfer power from the engine to the second rotation element, wherein the backward motion brake is an engagement brake which stops the first rotation element by meshing with the first rotation element when the forward maneuver is selected, the input clutch is a friction clutch having a clutch hydraulic servo to which oil pressure is supplied when the backward maneuver is selected, and the control apparatus comprises a second control means which releases the backward motion brake from engagement and which causes the oil pressure for the clutch hydraulic servo to remain at a predetermined pressure until immediately before the start of the engagement of the friction clutch, until at least meshing of the backward motion brake is released when the forward maneuver is selected from the condition in which backward maneuver is achieved and to raise the oil pressure after release of meshing with predetermined characteristics.

3. The control apparatus for an automatic transmission according to claim 1, wherein the automatic transmission further comprises a third rotation element which is stopped by meshing to achieve forward maneuver;

and a friction brake to stop by meshing the third rotation element, the forward maneuver of the transmission mechanism is achieved by engagement of the input clutch and stopping by meshing of the third rotation element by the friction brake, and the first control means brings the input clutch to stand-by status by lowering the oil pressure for the clutch hydraulic servo to the pressure of piston stroke until immediately before the input clutch starting engagement when the backward maneuver is selected from the condition in which the forward maneuver is achieved.

4. The control apparatus for an automatic transmission according to claim 2, wherein the backward maneuver of the transmission mechanism is achieved by engagement of the backward motion brake and meshing of the input clutch, and the second control means brings the input clutch to stand-by status by lowering the oil pressure for the clutch hydraulic servo to the oil pressure of the piston stroke until immediately before start of engagement of the input clutch.

5. The control apparatus for an automatic transmission according to claim 1, wherein the backward motion brake comprises a hydraulic servo and an engagement member which moves against pressure force of a return spring by the motion of the hydraulic servo and engages with a predetermined rotation element, the control apparatus comprises a first determination means which determines completion of motion of the engagement member after start of engagement of engagement member of the backward motion brake, and the first control means raises the oil pressure as determined by the first determination means.

6. The control apparatus for an automatic transmission according to claim 2, wherein the backward motion brake comprises a hydraulic servo and an engagement member which moves against pressure force of a return spring by the motion of the hydraulic servo and engages with a predetermined rotation element, the control apparatus comprises a second determination means which determines release of engagement of the engagement member after retreat of the engagement member of the backward motion brake, and the second control means raises the oil pressure as determined by the second determination means.

7. The control apparatus for an automatic transmission according to claim 5, wherein the first determination means determines the completion of movement of the engagement member by passage of a first setting time after selection of the backward maneuver, and the first setting time is set from the start of supplying oil pressure for the hydraulic servo of the backward motion brake to the completion of the movement of the engagement member.

8. The control apparatus for an automatic transmission according to claim 5, wherein the first determination means comprises an oil pressure sensor provided in an oil path connecting to the hydraulic servo of the backward motion brake and determines the start of engagement when the signals from the oil pressure sensor reaches the oil pressure value corresponding to the motion completion position of the engagement member.

9. The control apparatus for an automatic transmission according to claim 6, wherein the second determination means determines the release of meshing of the engagement member by passage of a second setting time after a release of the selection of the backward maneuver, and the second setting time is set from the start of exhaust of the oil pressure for the hydraulic servo of the backward motion brake to the release of the engagement of the engagement member.

10. The control apparatus for an automatic transmission according to claim 6, wherein the second determination means comprises a oil pressure sensor provided in an oil path connecting to the hydraulic servo of the backward motion brake and determines the release of engagement when the signals from the oil pressure sensor reach the oil pressure value corresponding to the engagement release position of the engagement member.

11. The control apparatus for an automatic transmission according to claim 3, wherein the backward motion brake comprises a hydraulic servo and an engagement member which moves against pressure force of a return spring by the motion of the hydraulic servo and engages with a predetermined rotation element, the control apparatus comprises a first determination means which determines completion of motion of the engagement member after start of engagement of engagement member of the backward motion brake, and the first control means raises the oil pressure as determined by the first determination means.

12. The control apparatus for an automatic transmission according to claim 11, wherein the first determination means determines the completion of movement of the engagement member by passage of a first setting time after selection of the backward maneuver, and the first setting time is set from the start of supplying oil pressure for the hydraulic servo of the backward motion brake to the completion of the movement of the engagement member.

13. The control apparatus for an automatic transmission according to claim 11, wherein the first determination means comprises an oil pressure sensor provided in an oil path connecting to the hydraulic servo of the backward motion brake and determines the start of engagement when the signals from the oil pressure sensor reaches the oil pressure value corresponding to the motion completion position of the engagement member.

14. The control apparatus for an automatic transmission according to claim 4, wherein the backward motion brake comprises a hydraulic servo and an engagement member which moves against pressure force of a return spring by the motion of the hydraulic servo and engages with a predetermined rotation element, the control apparatus comprises a second determination means which determines release of engagement of the engagement member after retreat of the engagement member of the backward motion brake, and the second control means raises the oil pressure as determined by the second determination means.

15. The control apparatus for an automatic transmission according to claim 14, wherein the second determination means determines the release of meshing of the engagement member by passage of a second setting time after a release of the selection of the backward maneuver, and the second setting time is set from the start of exhaust of the oil pressure for the hydraulic servo of the backward motion brake to the release of the engagement of the engagement member.

16. The control apparatus for an automatic transmission according to claim 14, wherein the second determination means comprises a oil pressure sensor provided in an oil path connecting to the hydraulic servo of the backward motion brake and determines the release of engagement when the signals from the oil pressure sensor reach the oil pressure value corresponding to the engagement release position of the engagement member.

17. A control apparatus for an automatic transmission, comprising:

- a transmission mechanism to achieve forward maneuver and backward maneuver;
- a first rotation element which is stopped by meshing to achieve backward maneuver;
- a second rotation element to transfer power to the transmission mechanism;
- a backward motion brake to stop the first rotation element by meshing; and
- an input clutch to transfer power from the engine to the second rotation element, wherein the backward motion brake is an engagement brake which stops the first rotation element by meshing with the first rotation element, the input clutch is a friction clutch having a clutch hydraulic servo to which oil pressure is supplied when the backward maneuver is selected, and the control apparatus comprises a control means which causes the oil pressure for the clutch hydraulic servo to remain at a predetermined pressure until immediately before the start of the engagement of the friction clutch, while at least meshing of the backward motion brake is either achieved or released, and to raise the oil pressure after said one of achievement or release of meshing at a predetermined pressure characteristics.

* * * * *